United States Patent [19]

Migliori et al.

[11] 4,443,837

[45] Apr. 17, 1984

[54] MOUNTING FIXTURE FOR A CAMERA LIGHT STAND

[75] Inventors: Albert Migliori; Stephen D. Northup, both of Santa Fe, N. Mex.

[73] Assignees: Philip M. Casady; Melvin A. Pfaelzer, both of Santa Fe, N. Mex.

[21] Appl. No.: 427,978

[22] Filed: Sep. 29, 1982

[51] Int. Cl.³ .............................................. F21V 21/00
[52] U.S. Cl. ..................................... 362/396; 362/16; 362/18; 362/278; 362/319; 362/320; 362/347; 362/355; 362/361; 362/431; 362/449
[58] Field of Search ................... 362/396, 16, 18, 278, 362/319, 320, 347, 355, 361, 431, 449

[56] References Cited

U.S. PATENT DOCUMENTS

| | | | |
|---|---|---|---|
| 3,851,164 | 11/1974 | Intrator | 362/17 X |
| 4,187,531 | 2/1980 | Lowell et al. | 362/17 |
| 4,210,952 | 7/1980 | Ressmeyer | 362/16 |

*Primary Examiner*—Stephen J. Lechert, Jr.

*Attorney, Agent, or Firm*—William A. Eklund

[57] ABSTRACT

A mounting fixture for supporting up to two electronic flash lamps and a reflective light umbrella on a photographic light stand is disclosed. The fixture includes two orthogonal flash lamp shoe brackets and an integral deflectable locking arm for securing the fixture body to a vertical post of a light stand. A locking bolt passes through coaxial bores in the arm and the fixture body. The locking bolt includes a cylindrical head having a transverse bore for receiving a shaft of a reflective umbrella. A tubular locking collar is interposed on the shaft of the bolt between the fixture body and the head of the locking bolt. The locking collar includes a pair of diametrically opposed semicircular recess cut into its tubular end edge which are alignable with the openings of the bore in the head of the bolt. The locking collar, together with the bolt head, operates to secure an umbrella shaft in place when the bolt is tightened to secure the mounting fixture on a light stand.

10 Claims, 6 Drawing Figures

MOUNTING FIXTURE FOR A CAMERA LIGHT STAND

BACKGROUND OF THE INVENTION

The invention disclosed herein is generally related to mounting fixtures for supporting cameras, photographic flash lamps and the like. In particular, this invention is related to mounting fixtures for photographic light stands.

Professional photographers make frequent use of portable light stands which support flash lamps, reflective umbrellas for providing diffused illumination, and other types of lighting equipment. Critical to the efficient use of such assemblies is the ease with which the various pieces of equipment can be assembled on the stand and properly adjusted. In ordinary practice the orientation of each piece of equipment must be independently adjusted to provide optimum illumination conditions. When this must be done by successive adjustment and securing of each piece of equipment, the process can be time-consuming and awkward. Accordingly, it is the object and purpose of the present invention to provide a mounting fixture for a photographic light stand which is capable of supporting one or more camera flash lamps as well as a reflective lighting umbrella, and which permits independent yet rapid adjustment of the orientation of such equipment. More particularly, it is the object of this invention to provide such a mounting fixture which allows the flash lamps and umbrella to each be properly adjusted for orientation, and which allows these pieces of equipment to be subsequently secured in position in a single mechanical operation.

Also important to the background of this invention is the recent advent of improved flash lamp power supplies which permit the use of small, lightweight electronic flash lamps in professional applications. Such lamps are desirable because two or more such lamps may be used at once, as opposed to a single large professional flash lamp. This permits, for example, one lamp to be used to provide direct illumination of a photgraphic subject while another lamp is used in combination with a reflective umbrella to provide diffused illumination. It will be appreciated that the use of multiple flash lamps in such a manner provides greatly increased flexibility in illumination over the use of single lamps.

Accordingly, it is another object of the present invention to provide a mounting fixture which is capable of supporting two electronic flash lamps as well as a reflective light umbrella, and which permits these items to be independently adjusted in position and orientation. Further, it is an object to provide such a mounting fixture wherein a pair of electronic flash lamps and a reflective umbrella may be independently adjusted and subsequently secured at once in a single operation.

These and other objects of the present invention will be set forth in the description below, and will be apparent to one of ordinary skill in the art upon practice of the invention.

SUMMARY OF THE INVENTION

Accordingly, in accordance with the objects and purposes set forth above, the mounting fixture of the present invention comprises a generally rectangular solid fixture body having first and second flash lamp shoe brackets oriented substantially orthogonally to one another for supporting up to two camera flash lamps. The fixture further includes an integral deflectable locking arm formed in the fixture body for clamping the fixture body to a mounting post of a camera light stand. The fixture body is secured to a vertical light stand post by means of a locking bolt passing through coaxial bores in the fixture body and the deflectable locking arm, such that tightening of the bolt results in deflection of the locking arm to clamp the fixture body to a mounting post. The locking bolt includes a cylindrical head having a transverse bore which is sized to receive the shaft of a reflective light umbrella. The fixture further includes a tubular locking collar which is positioned on the shaft of the locking bolt between the bolt head and the fixture body, and which receives the cylindrical head of the locking bolt. The tubular edge of the locking collar includes a pair of semicircular recesses which are alignable with the openings of the bore in the head of the locking bolt, such that when the bolt is tightened the tubular collar operates to engage and secure the shaft of the reflective umbrella. Thus, in a single motion the fixture can be secured to the light stand and the reflective umbrella secured to the fixture. This arrangement permits a photographer to precisely adjust the orientations of the reflective umbrella and both flash lamps and then secure the entire assembly in a single motion once the desired orientations have been obtained.

These and other aspects of the present invention are more fully set forth in the accompanying drawings and in the following detailed description of the preferred embodiment.

BRIEF DESCRIPTION OF THE DRAWINGS

The accompanying drawings, which are incorporated in and form a part of the specification, illustrate the preferred embodiment and the best mode known to the inventors of carrying out their invention. The drawings, together with the detailed written description set forth below, serve to explain the principles of the invention as well as the manner of making and using the same. In the drawings.

DETAILED DESCRIPTION OF THE PREFERRED EMBODIMENT

Figure 6:
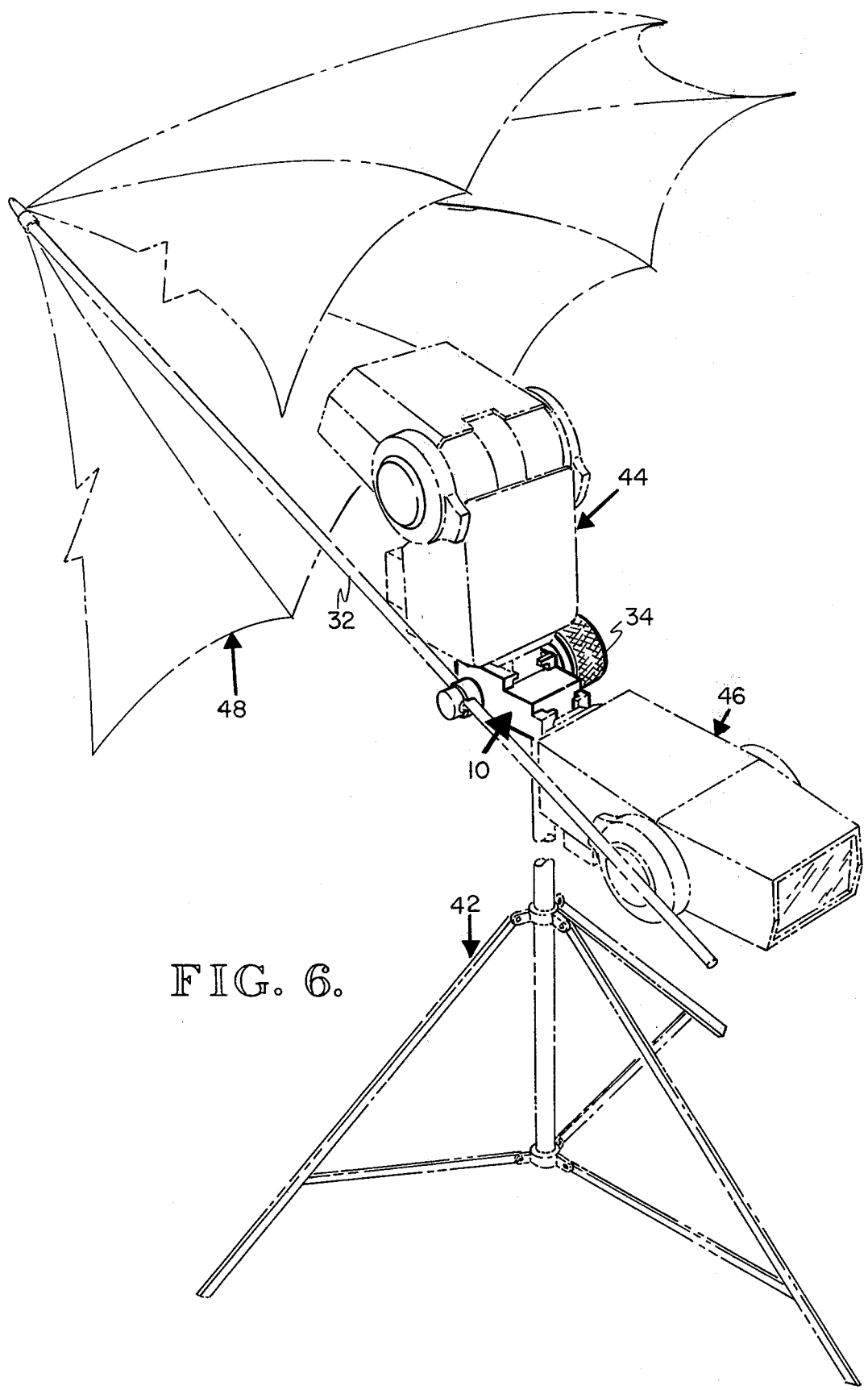
FIG. 6 is a pictorial view of the mounting fixture as it is used in combination with a light stand to support two electronic flash lamps and a reflective light umbrella.

The preferred embodiment of the mounting fixture of the present invention is adapted to be mounted on a vertical shaft of a conventional photographic light stand. As discussed further below and as illustrated in FIG. 6, the mounting fixture is designed to support a pair of shoe-mounted electronic camera flash lamps and a reflective light umbrella, which together can be arranged to illuminate a photographic subject in several different ways depending on the circumstances at hand.

The fixture includes a generally rectangular, solid fixture body 10 which is ordinarily mounted on a light stand with its longitudinal axis extending horizontally. Since the fixture ordinarily has a definite orientation with respect to a photographic subject, it will be described below with reference to its forward and rear ends as well as its left- and right-hand sides, with these terms having the reference point of an observer positioned behind the fixture and facing a photographic subject. The fixture body 10 includes a first shoe bracket 12 integrally formed on its upper surface and a second shoe bracket 14 integrally formed on its forward end surface, such that the second bracket 14 is oriented orthogonally with respect to the first bracket 12. The first shoe bracket 12 consists of a pair of parallel opposing angle rails 12a and 12b which extend along the opposite longitudinal edges of the upper surface of the fixture body. Each rail includes an upwardly extending web and an integral, horizontally extending web which extends inwardly toward the center of the fixture body. The rails 12a and 12b extend longitudinally from the rear edge of the upper surface of the body 10 to slightly past the midpoint of the upper surface. This arrangement provides a flat upwardly facing surface at the forward end of the body 10 which facilitates insertion of a flash lamp shoe into the bracket 12a. More particularly, insertion of a flash lamp shoe is accomplished by pressing the bottom of the shoe flushly against the forward upper surface of the fixture body 10 and then sliding the shoe rearwardly into the bracket 12a, with the shoe being guided by the forward surface in parallel alignment into engagement with the bracket rails 12a and 12b.

The second shoe bracket 14 is substantially identical to the first bracket 12, and includes opposing angle rails 14a and 14b which extend from the bottom edge of the forward end surface of the fixture body upwardly along the opposite side edges of the forward surface to a point short of the upper edge of the forward end surface. As with the bracket 12, there is provided a small surface adjacent the upper ends of the rails 14a and 14b which facilitates the insertion of a flash lamp shoe into engagement with the rails of the bracket 14.

The fixture body 10 is further provided with a pair of intersecting elongate slots 16a and 16b, which are cut into the body 10 from the left-hand side and the bottom surface of the body, respectively. Each slot extends in length from the rear end surface of the fixture body 10 forwardly to a point beyond the midpoint of the body. The slots 16a and 16b intersect orthogonally so as to form an integral, deflectable locking arm 18 which is employed in the manner described below as a locking element for securing the mounting fixture to a camera light stand. A transverse bore 20 extends horizontally through the arm 18 near its rear end, and a coaxially aligned bore 22 extends horizontally through the rear end of the fixture body 10 so as to open on the right-hand side of the body 10. The bore 22 opens onto an annular recess 24 which is formed in the right-hand side of the fixture body and is centered on the bore 22.

Through the bores 18 and 20 there is passed a locking bolt 26. The locking bolt 26 includes a cylindrical head 26a through which passes a transverse bore 26b having an inside diameter suitable for insertion of the shaft of a light umbrella. In use the bolt is inserted through the bores 18 and 20 with the head 26 on the right-hand side of the fixture body 10.

Positioned adjacent the head 26a on the bolt 26 are a locking collar 28 and a lock washer 30. The locking collar 28 is generally tubular in shape, with a planar end surface 28a that is centrally bored to the diameter of the shaft of the bolt 26. The inside diameter of the collar 28 is sized so that the collar fits closely over the head 26a of the bolt 26, and the outside diameter of the collar 28 is sized so that the collar may be closely received in the annular recess 24 on the right-hand side of the fixture body 10. The locking collar 28 further includes a pair of semicircular recesses 28b cut into the tubular end edge of the collar. These recesses 28b are positioned diametrically with respect to one another on opposite sides of the collar 28, and have a radius of curvature which is approximately the same as that of the bore 26b in the head of the bolt 26. With the head of the bolt inserted in the collar, the collar may be rotated so as to bring the recesses 28b into alignment with the openings of the bore 26b. With the collar and bolt so aligned, the depth of the collar is such that when the cylindrical head 26a of the bolt 26 is fully inserted in the collar, the circularly curved edges of the semicircular recesses 28b overlap slightly the openings of the bore 26b. Consequently, when the bolt head is tightened against the locking collar with an umbrella shaft 32 inserted in the bore of the head, the collar 28 operates to engage and securely lock the umbrella shaft 32 in place. Additionally, the engagement of the locking collar 28 with the umbrella shaft 32 operates to interlock the collar 28 and the head 26a to thereby prevent relative rotation of the bolt 26 and the collar 28.

The lock washer 30 is interposed between the planar end surface 28a of the locking collar and the annular planar surface of the recess 24 formed in the side of the fixture body 10. When the bolt is tightened the lock washer 30 operates to secure the collar 28 against rotation, thereby also securing the umbrella shaft 32 against rotation about the axis of the bolt 26.

Figure 1:
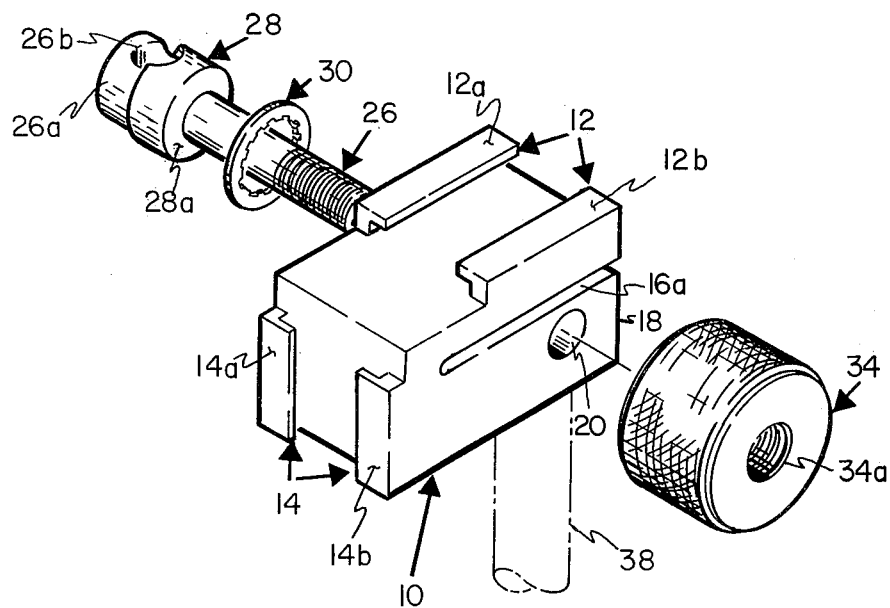
FIG. 1 is an exploded isometric view of the preferred embodiment of the mounting fixture of the present invention.
Figure 2:
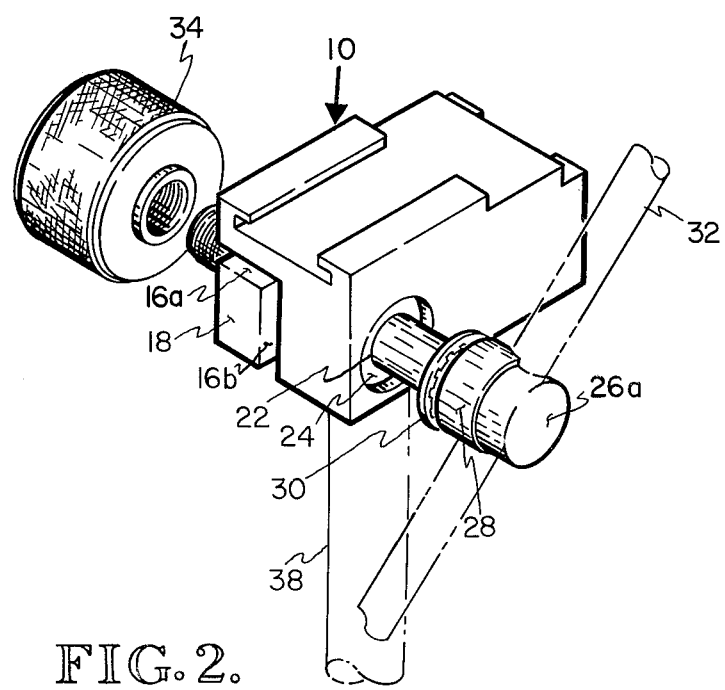
FIG. 2 is an isometric view of the mounting fixture of FIG. 1, taken from the rear and to the right-hand side of the fixture.
Figure 3:
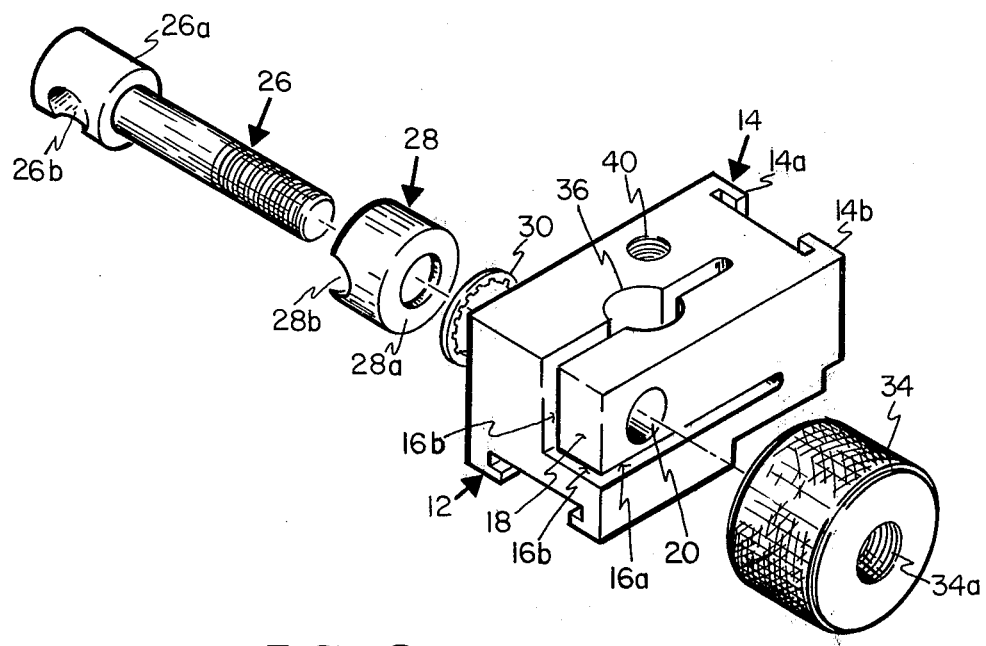
FIG. 3 is an isometric exploded view of the mounting fixture of FIG. 1, with the fixture turned upside down to illustrate further details of construction.
Figure 4:
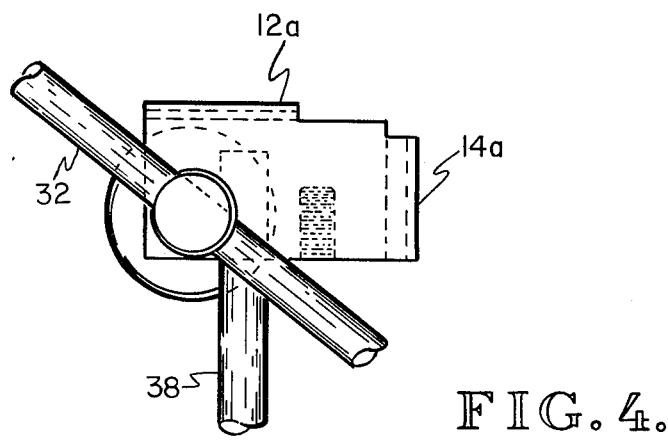
FIG. 4 is a side elevation view of the right-hand side of the mounting fixture of FIG. 1.

The bolt 26 is tightened by means of a knurled knob 34 having a threaded central bore 34a. The fixture body 10 is further provided with a vertical bore 36, best illustrated in FIG. 3, which extends into the body 10 from its lower surface and which is bisected by the vertical slot 16a. The bore 36 is sized to receive a post 38 of a standard photographic light stand, as shown in FIGS. 1 and 2.

Additionally, a vertical threaded bore 40 is provided in the bottom surface of the fixture body 10 for securing the mounting fixure to a standard ¼-20 threaded shaft of a conventional photographic tripod stand.

Figure 5:
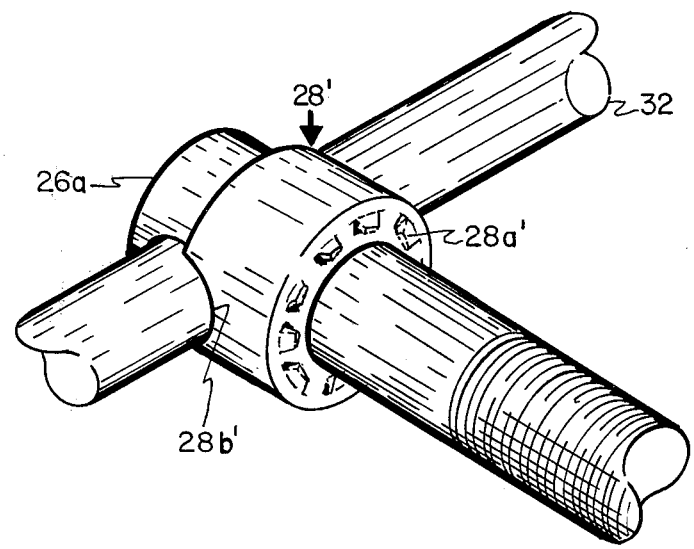
FIG. 5 is an enlarged isometric view of one portion of an alternative preferred embodiment of the mounting fixture of the present invention.

An alternative preferred embodiment of the invention is illustrated in FIG. 5, wherein the lock washer 30 of the preferred embodiment is eliminated and replaced with a locking collar 28' that is provided with a planar end surface 28a' having integrally formed locking lugs.

In operation, the mounting fixture is first placed loosely on the vertical post of a photographic light stand, such as the stand 42 shown in FIG. 6, with the locking bolt and collar assembly installed but not tightened. One or two electronic flash lamps may then be attached to the fixture. FIG. 6 illustrates the use of a pair of flash lamps 44 and 46 which are each provided with rotatable flash heads to permit directional adjustment of the lamp after it is installed on the mounting fixture. The shaft 32 of a reflective umbrella 48 is then inserted in the bore of the bolt head 26a and the locking collar is positioned with the recesses 28b engaged against the umbrella shaft. At this point the bolt assembly may be gently tightened to permit fine adjustment of the orientations of the flash lamps 44 and 46 and the umbrella 48. Once the desired orientation is achieved, the locking bolt is finally tightened to secure the lamps and umbrella in place.

It will be appreciated that the final orientations of the two lamps and the umbrella may all be secured at once by the single motion of tightening the knurled knob 34. By the same tightening motion the entire assembly is firmly secured to the light stand post. This economy of functions results in a particularly simple to use yet efficient mounting apparatus.

It will be further appreciated that the two flash lamps supported by the mounting fixture may be used in several arrangements. In the arrangement illustrated in FIG. 6, for example, one flash lamp is directed toward a photographic subject while the other is directed toward the reflective umbrella to provide diffused illumination. In another possible arrangement both flash lamps may be directed at the subject to provide maximum direct illumination.

Although the present invention is described above with reference to the preferred embodiment and an alternative preferred embodiment, it will be understood that various modifications, substitutions and alterations may be made from these embodiments without departing from the spirit of the invention. Accordingly, the scope of the invention is defined by the following claims.

The embodiments of the invention for which patent protection is claimed are as follows:

1. A mounting fixture for a photographic light stand, comprising a generally rectangular solid fixture body having first and second flash lamp shoe brackets formed integrally thereon, said shoe brackets being oriented substantially orthogonal to one another, said fixture body further including an integral deflectable locking arm for clamping said fixture body to a post of a photographic light stand, said fixture body and said deflectable locking arm having coaxial bores, a locking bolt and associated nut means, said bolt extending through said bores for deflecting said arm to lock said fixture body to a post, said bolt having a threaded shaft and a cylindrical head with a transverse bore passing therethrough for receiving a shaft of a reflective light umbrella, a locking collar positioned on said bolt between said cylindrical head and said fixture body, said collar being generally tubular with a planar end surface bored to receive the shaft of said bolt, said collar having an inside diameter sized such that said collar closely receives said cylindrical head when said bolt is tightened, said collar further including a pair of semicircular recesses cut into the tubular end edge of said collar, said recesses being alignable with the bore through said head so as to permit an umbrella shaft to be inserted through said bore in said head and engaged by said collar, whereby upon tightening of said bolt said umbrella shaft is secured by said collar and said head.

2. The mounting fixture defined in claim 1 wherein further including locking means interposed between said fixture body and said locking collar for preventing rotation of said bolt and said collar when said bolt is tightened.

3. The mounting fixture defined in claim 2 wherein said locking means is integrally formed on said planar end surface of said locking collar.

4. The mounting fixture defined in claim 3 wherein said fixture body includes an annular recess centered on the opening of said bore from said body, said recess being sized to receive and guide said locking collar and said locking means upon tightening of said locking bolt.

5. The mounting fixture defined in claim 1 wherein said fixture body includes an upper rectangular substantially planar surface and wherein said first shoe bracket includes a pair of angle rails extending upwardly from said upper surface and which extend parallel to the parallel side edges of said surface, said angle rails extending from the rear end of said fixture body to a point short of the forward end of the fixture body so as to form a forward upper surface that is operable to guide a flash lamp shoe into alignment with said angle rails during installation.

6. The mounting fixture defined in claim 5 wherein said fixture body includes a forward substantially rectangular and planar surface and wherein said second shoe bracket includes a pair of angle rails which extend forwardly from the opposite side edges of said forward surface, said angle rails of said second bracket extending from the lower edge of said forward surface upwardly to a point short of the upper edge of said forward surface so as to form an upper surface that is operable to guide a flash lamp shoe in alignment with rails during installation.

7. The mounting fixture defined in claim 1 wherein said integral deflectable locking arm is formed by a pair of transverse intersecting slots which are cut into said fixture body from a bottom surface and one side surface of said fixture body.

8. The mounting fixture defined in claim 7 wherein said fixture body further includes a vertical bore opening onto said bottom surface for receiving a mounting post of a photographic light stand, said bore being bisected by said slot cut into said body from said bottom surface.

9. The mounting fixture defined in claim 8 wherein said fixture body further comprising a second, threaded bore opening onto said bottom surface for receiving a threaded shaft of a camera tripod stand.

10. The mounting fixture defined in claim 4 wherein said semicircular recesses cut into the tubular end edge of said locking collar have a radius of curvature slightly larger than the radius of said transverse bore in said cylindrical head, so as to receive and secure umbrella shafts of varying diameter.

* * * * *